United States Patent
Chang

(10) Patent No.: US 6,796,570 B1
(45) Date of Patent: Sep. 28, 2004

(54) FOOT-TREAD TYPE SCOOTER

(76) Inventor: Hung-Shen Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/724,388

(22) Filed: Nov. 18, 2003

(51) Int. Cl.[7] ............................................... B62M 1/04
(52) U.S. Cl. ..................... 280/255; 280/221; 280/14.28
(58) Field of Search ................................ 280/220, 221, 280/252, 253, 255, 258, 14.27, 14.28

(56) References Cited

U.S. PATENT DOCUMENTS

| | | | | |
|---|---|---|---|---|
| 4,124,222 A | * | 11/1978 | Moe et al. ................... | 280/221 |
| 4,186,934 A | * | 2/1980 | Collings ...................... | 280/221 |
| 4,828,284 A | * | 5/1989 | Sandgren .................... | 280/221 |
| 4,861,054 A | * | 8/1989 | Spital ......................... | 280/221 |
| 4,915,403 A | * | 4/1990 | Wild et al. .................. | 280/221 |
| 5,192,089 A | * | 3/1993 | Taylor ........................ | 280/221 |
| 5,224,719 A | * | 7/1993 | Goodspeed ............ | 280/11.115 |
| 5,310,202 A | * | 5/1994 | Goodspeed ................. | 280/221 |
| 2004/0036249 A1 | * | 2/2004 | McGuire et al. ............ | 280/253 |

FOREIGN PATENT DOCUMENTS

DE        3942658        * 8/1990        ............ B62M/1/02

* cited by examiner

Primary Examiner—Avraham Lerner

(57) ABSTRACT

A scooter includes a main frame, a tread board, a oneway bearing, and a linkage. Thus, the user can tread the pedal of the tread board successively to move the scooter forward, and the user's two feet need not to leave the main frame of the scooter, thereby facilitating the user operating the scooter.

8 Claims, 2 Drawing Sheets

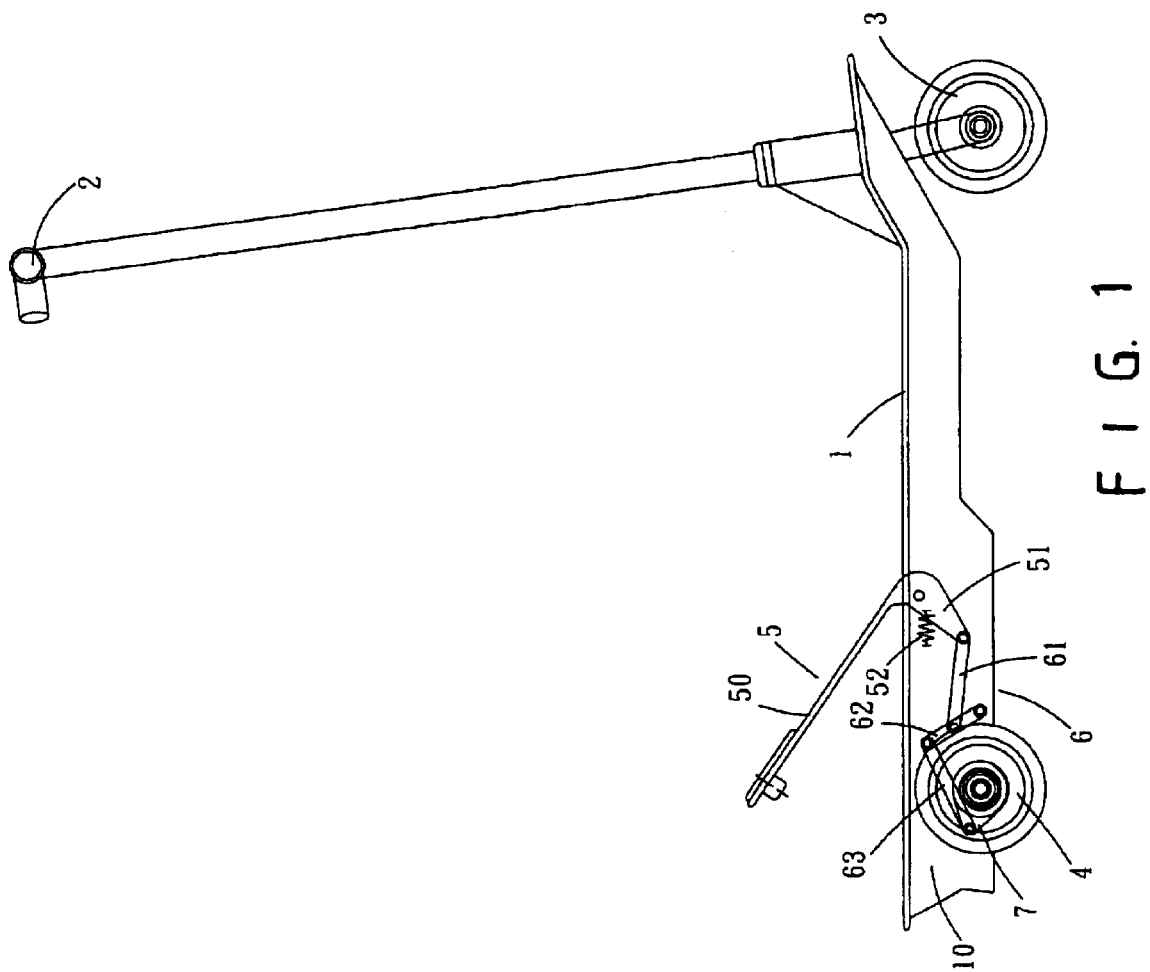
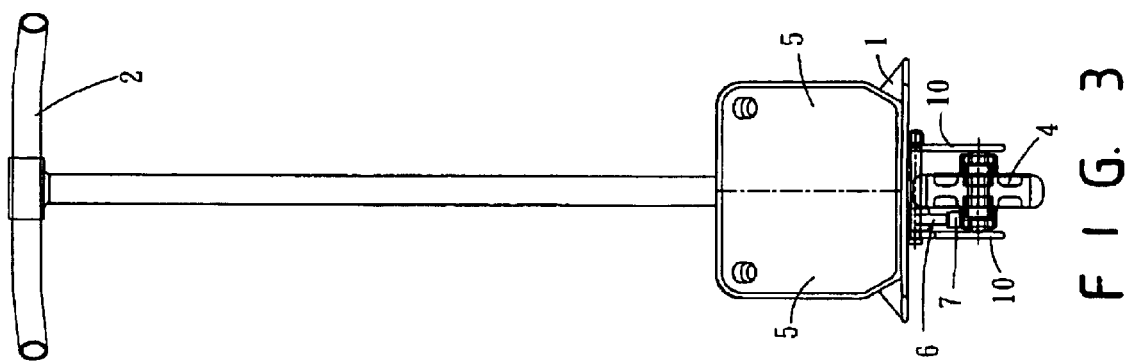

FOOT-TREAD TYPE SCOOTER

BACKGROUND OF THE INVENTION

1. Field of the Invention

The present invention relates to a scooter, and more particularly to a foot-tread type scooter, wherein the user can tread the pedal of the tread board successively to move the scooter forward, and the user's two feet need not to leave the main frame of the scooter, thereby facilitating the user operating the scooter.

2. Description of the Related Art

A conventional scooter comprises a main frame having a front end provided with a handle for rotating and controlling a front wheel and a second end provided with a rear wheel. When in use, the user's one foot treads the main frame and the user's other foot steps the ground to produce a driving force so as to drive the conventional scooter to move forward.

However, the user's one foot treads the main frame and the user's other foot has to leave the scooter to step the ground, thereby consuming much manual work and causing inconvenience to the user. In addition, the balance effect of the conventional scooter is poor because the user's other foot has to leave the scooter to step the ground, thereby easily causing danger to the user during movement of the conventional scooter.

SUMMARY OF THE INVENTION

The primary objective of the present invention is to provide a scooter, wherein the user can tread the pedal of the tread board successively to move the scooter forward, and the user's two feet need not to leave the main frame of the scooter, thereby facilitating the user operating the scooter.

Another objective of the present invention is to provide a scooter, wherein the tread board, the linkage and the oneway bearing co-operate with each other to move the scooter, so that the scooter has a simple structure and has little wear.

A further objective of the present invention is to provide a scooter, wherein the first link is pivotally connected with the second link at different pivot positions, thereby producing different torque and distance of operation so as to adjust the force output of the tread board and the traveling velocity of the scooter, thereby fitting the user's different requirements.

In accordance with the present invention, there is provided a scooter, comprising a main frame, a tread board, a oneway bearing, and a linkage, wherein:

the main frame has a front end provided with a handle for rotating and controlling a front wheel and a second end formed with a support plate and provided with a rear wheel;

the tread board is pivotally mounted on the support plate of the main frame and has a first end formed with a pedal and a second end formed with a pivot end;

the oneway bearing is mounted on the rear wheel of the main frame; and the linkage is mounted between the support plate of the main frame and the tread board and includes a first link having a first end pivotally mounted on a distal end of the pivot end of the tread board, a second link having a first end pivotally mounted on the support plate of the main frame and a mediate portion pivotally mounted on a second end of the first link, and a third link having a first end pivotally mounted on a second end of the second link and a second end pivotally mounted on the oneway bearing.

Further benefits and advantages of the present invention will become apparent after a careful reading of the detailed description with appropriate reference to the accompanying drawings.

BRIEF DESCRIPTION OF THE DRAWINGS

FIG. 1 is a side plan view of a scooter in accordance with the preferred embodiment of the present invention;

FIG. 3 is a rear plan view of the scooter in accordance with the preferred embodiment of the present invention.

DETAILED DESCRIPTION OF THE INVENTION

Figure 2:
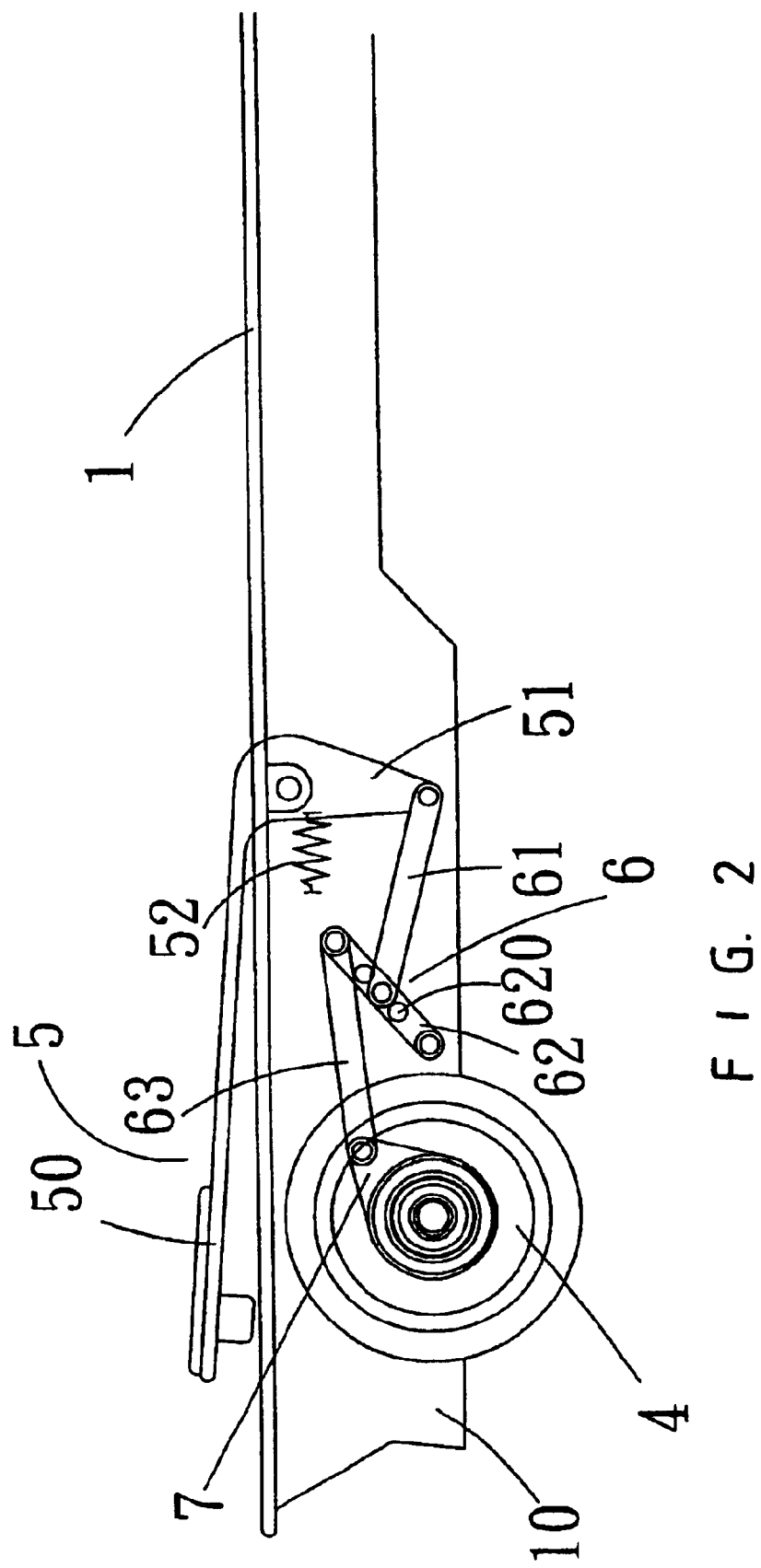
FIG. 2 is a schematic operational view of the scooter as shown in FIG. 1 in use.

Referring to FIGS. 1–3, a scooter in accordance with the preferred embodiment of the present invention comprises a main frame 1, a tread board 5, a oneway bearing 7, and a linkage 6.

The main frame 1 has a front end provided with a handle 2 for rotating and controlling a front wheel 3 and a second end formed with a substantially inverted U-shaped support plate 10 and provided with a rear wheel 4.

The tread board 5 is pivotally mounted on the support plate 10 of the main frame 1. The tread board 5 is substantially L-shaped and has a first end formed with a pedal 50 and a second end formed with a pivot end 51 with an angle with respect to the pedal 50. The pedal 50 of the tread board 5 is located above the main frame 1 and has an angle with respect to the main frame 1 at the normal state as shown in FIG. 1. The pivot end 51 of the tread board 5 is located under the main frame 1 and has an angle with respect to the main frame 1 at the normal state as shown in FIG. 1. The scooter further comprises an elastic member 52 mounted between the support plate 10 of the main frame 1 and a side of the pivot end 51 of the tread board 5 to provide a restoring force on the pivot end 51 of the tread board 5.

The oneway bearing 7 is mounted on the rear wheel 4 of the main frame 1.

The linkage 6 is mounted between the support plate 10 of the main frame 1 and the tread board 5 and includes a first link 61 having a first end pivotally mounted on a distal end of the pivot end 51 of the tread board 5, a second link 62 having a first end (fixed end) pivotally mounted on the support plate 10 of the main frame 1 and a mediate portion pivotally mounted on a second end of the first link 61, and a third link 63 having a first end pivotally mounted on a second end (movable end) of the second link 62 and a second end pivotally mounted on the oneway bearing 7.

In addition, the mediate portion of the second link 62 is formed with a plurality of adjusting holes 620 as shown in FIG. 2 for pivoting the second end of the first link 61, so that the first link 61 is pivotally connected with the second link 62 at different pivot positions, thereby producing different torque and distance of operation so as to adjust the force output of the tread board 5 and the traveling velocity of the scooter, thereby fitting the user's different requirements.

In operation, when the user treads the pedal 50 of the tread board 5 as shown in FIG. 2, the pivot end 51 of the tread board 5 is pivoted relative to the support plate 10 of the main frame 1 to drive and move the first link 61 which drives and moves the second link 62 which drives and moves the third link 63 which drives and moves the oneway bearing 7 which drives the rear wheel 4 of the main frame 1 to rotate in one direction only, so that the scooter is moved forward by the rear wheel 4 of the main frame 1.

Accordingly, the user can tread the pedal 50 of the tread board 5 successively to move the scooter forward, and the user's two feet need not to leave the main frame 1 of the scooter, thereby facilitating the user operating the scooter. In addition, the tread board 5, the linkage 6 and the oneway bearing 7 co-operate with each other to move the scooter, so that the scooter has a simple structure and has little wear.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A scooter, comprising a main frame, a tread board, a oneway bearing, and a linkage, wherein:
   the main frame has a front end provided with a handle for rotating and controlling a front wheel and a second end formed with a support plate and provided with a rear wheel;
   the tread board is pivotally mounted on the support plate of the main frame and has a first end formed with a pedal and a second end formed with a pivot end;
   the oneway bearing is mounted on the rear wheel of the main frame; and
   the linkage is mounted between the support plate of the main frame and the tread board and includes a first link having a first end pivotally mounted on a distal end of the pivot end of the tread board, a second link having a first end pivotally mounted on the support plate of the main frame and a mediate portion pivotally mounted on a second end of the first link, and a third link having a first end pivotally mounted on a second end of the second link and a second end pivotally mounted on the oneway bearing.

2. The scooter in accordance with claim 1, wherein the support plate of the main frame is substantially inverted U-shaped.

3. The scooter in accordance with claim 1, wherein the tread board is substantially L-shaped.

4. The scooter in accordance with claim 1, wherein the pivot end of the tread board has an angle with respect to the pedal of the tread board.

5. The scooter in accordance with claim 1, wherein the pedal of the tread board is located above the main frame and has an angle with respect to the main frame at the normal state.

6. The scooter in accordance with claim 1, wherein the pivot end of the tread board is located under the main frame and has an angle with respect to the main frame at the normal state.

7. The scooter in accordance with claim 1, further comprising an elastic member mounted between the support plate of the main frame and a side of the pivot end of the tread board to provide a restoring force on the pivot end of the tread board.

8. The scooter in accordance with claim 1, wherein the mediate portion of the second link is formed with a plurality of adjusting holes for pivoting the second end of the first link, so that the first link is pivotally connected with the second link at different pivot positions.

* * * * *